United States Patent [19]

Kiekhaefer et al.

[11] Patent Number: 4,812,343
[45] Date of Patent: Mar. 14, 1989

[54] PULTRUDED FIBER REINFORCED PLASTIC MARKING DEVICES

[75] Inventors: John H. Kiekhaefer, Milwaukee; Jack E. Perko, Cedarburg; Joseph S. Hetzer, Milwaukee, all of Wis.; Frank W. Harris, Akron, Ohio

[73] Assignee: W. H. Brady Co., Milwaukee, Wis.

[21] Appl. No.: 148,813

[22] Filed: Jan. 27, 1988

[51] Int. Cl.[4] .................... B32B 5/06; B29C 67/00
[52] U.S. Cl. .................... 428/35.6; 264/122; 264/136; 427/394; 427/434.2; 428/36.1; 428/195; 428/294; 428/298; 428/220; 428/480; 428/532; 428/283; 428/297; 428/326; 428/247; 428/109; 428/285; 428/287; 428/295; 428/232
[58] Field of Search .................... 264/122, 136, 137; 428/36.1, 195, 35.6, 480, 294, 298, 220, 532; 427/394, 434.2

[56] References Cited

U.S. PATENT DOCUMENTS

| | | |
|---|---|---|
| Re. 32,045 | 12/1985 | Schmanski .................... 404/10 |
| 3,244,570 | 4/1966 | Boggs .................... 156/178 |
| 3,556,888 | 1/1971 | Goldsworthy .................... 156/73 |
| 4,061,435 | 12/1977 | Schmanski et al. .................... 404/10 |
| 4,252,696 | 2/1981 | McQuarrie .................... 260/16 |
| 4,708,623 | 11/1987 | Aoki et al. .................... 264/177.2 |
| 4,752,513 | 6/1988 | Rau et al. .................... 428/294 |

OTHER PUBLICATIONS

Meyer, Handbook of Pultrusion Technology (1985), pp. 1-93.

Primary Examiner—Ellis P. Robinson
Assistant Examiner—James J. Seidleck
Attorney, Agent, or Firm—Quarles & Brady

[57] ABSTRACT

Pultruded marking devices (29,42,45,48,50,55,57,58) made of fiber reinforcement materials (10,14,16,17) embedded in a cured polyester resin matrix that contains about 2% to 25% by weight of cellulose solid particulates. Unidirectional reinforcement materials (10) are the major portion of the reinforcement materials and form about 30% to 60% by weight of the total weight of the marking devices.

18 Claims, 3 Drawing Sheets

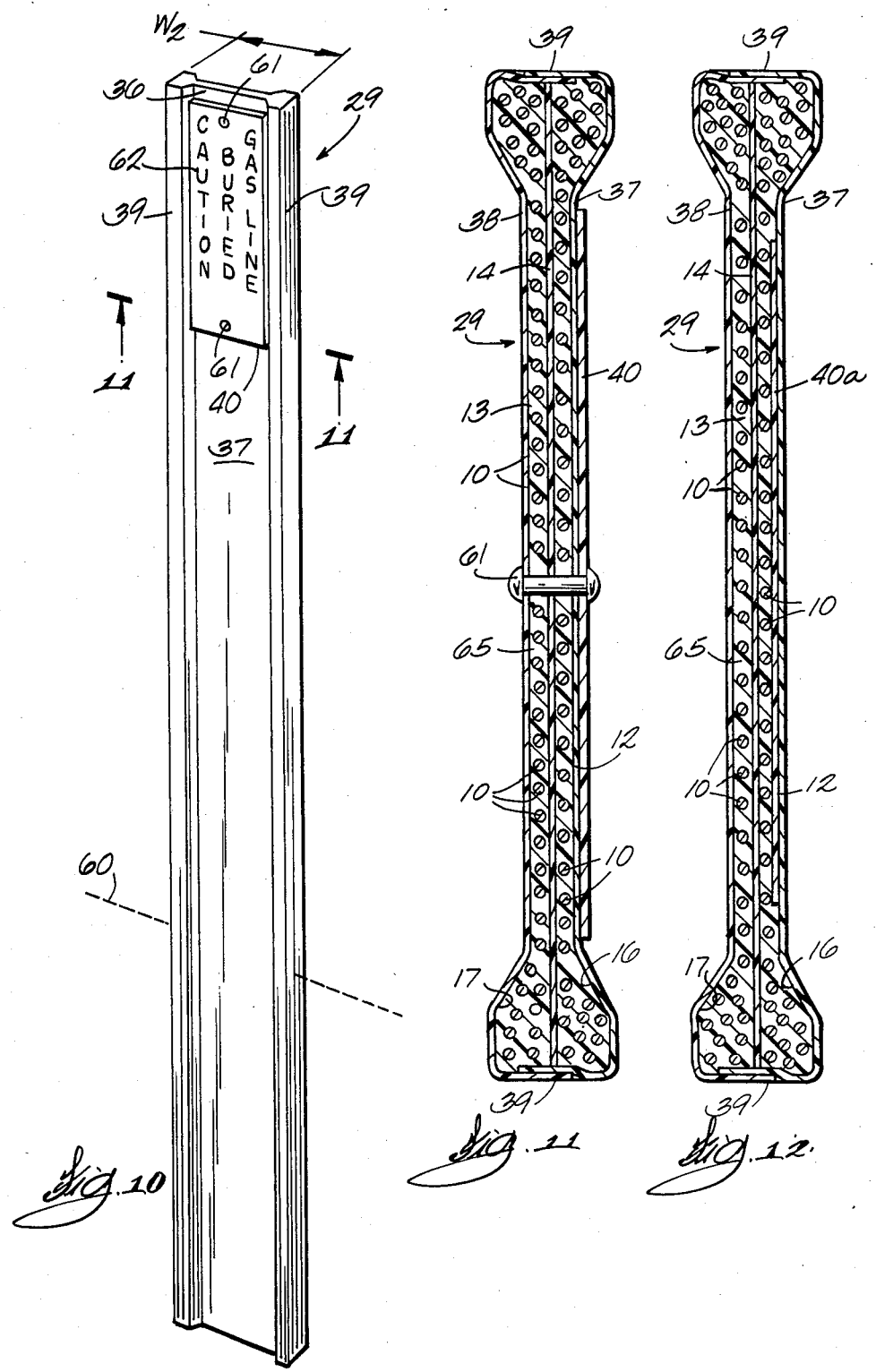

PULTRUDED FIBER REINFORCED PLASTIC MARKING DEVICES

TECHNICAL FIELD

This invention relates generally to the art of producing fiber reinforced plastic marking devices by pultrusion; more specifically, this invention relates to unique systems for the pultrusion of fiber reinforced plastic marking devices that include unidirectional fibers as reinforcement material.

BACKGROUND

Pultrusion, first developed in the early 1950's, is now a well-known process for the fabrication of reinforced plastic articles. Pultrusion methods and apparatus involve continuously pulling reinforcement materials in the form of continuous webs or strands from a supply station through a bath of catalyzed resin so as to impregnate the reinforcement material with the resin, and pulling the impregnated materials through a heated forming die in which the resin is polymerized to form a cured article. An appropriate puller mechanism is a component of pultrusion apparatus and engages the cured article after it leaves the die so as to pull the composite through the machine, including pulling the reinforcement materials from the supply station through the resin bath and the die. Pultrusion is an effective system for the continous production of solid or hollow articles that have a constant cross-sectional shape such as I-beams, sheets, plates, rods, channels, round and square tubes, and the like. The continuous cured reinforced plastic article is cut into selected lengths by a cut-off device, such as a saw, located downstream of the puller mechanism.

Unsaturated polyester resins are the resins most widely used in pultrusion processes, although vinyl ester resins, epoxy resins and some thermoplastic resins are also used but to a much lesser extent. Numerous types of unsaturated polyester resins suitable for pultrusion are commercially available. The specific polyester used for a particular product should be selected by reference to the expected service conditions, including consideration of factors such as temperature resistance, weather resistance, abrasion resistance, etc., required for the end product. Polyester resins are mixed with a styrene monomer which acts as a cross-linking agent for curing the polyester into a hard rigid mass. Thus the resin bath of a pultrusion machine will typically include an unsaturated polyester, styrene monomer and catalyst, together with fillers, additives, mold release agents and pigments as required.

As mentioned above, the reinforcing materials used in a composite made with pultrusion apparatus are continuously pulled through the heated die of the machine by the puller mechanism which is located downstream of the die so as to engage the cured article emerging from the die. This requires that the reinforcing material employed in a pultruded plastic composite article be supplied in the form of continous webs or strands in order to be pulled by the puller mechanism of the machine from a supply station through the heated die. The reinforcing materials typically employed are unidirectional, bidirectional and multidirectional materials. Continuous strand fiberglass rovings are an example of unidirectional reinforcement materials. Rovings are made from strands comprising a number (e.g. 50 or more) of continuous filaments or bundles of continuous filaments that are gathered together without mechanical twist and wound onto a cylindrical package or spool. Most pultruded fiber reinforced plastic products will include a substantial percentage of rovings, which provide for axial reinforcement and tensile strength of the finished product. Multidirectional reinforcement materials comprise continuous strand mats and may be employed in a pultruded part in order to improve transverse or cross directional physical properties. Resinous binders are generally used to hold the strands together and form a continous mat or web of the multidirectional reinforcing material. Mat is available in various weights in the range of about $\frac{1}{8}$ to 4 ounces per square foot. A specific type of multidirectional mat is a very lightweight mat of about $\frac{1}{2}$ ounce per square foot or less that is known as a surfacing mat or veil and is used to provide a resin rich surface that enhances the surface finish of the article. Bidirectional reinforcing materials comprise woven fabrics having spaced fibers or rovings woven or knit at right angles to one another or at other selected angles such as 30°, 45° and 60°; this form of reinforcement material has some elements that provide axial reinforcement and others at an angle thereto to provide for transverse reinforcement. Glass fiber is the most widely used reinforcement material for pultruded plastic products, although other synthetic fibers including polyester fibers, nylon fibers, aramid fibers and carbon fibers are used but on a more limited basis.

SUMMARY OF THE INVENTION

Our present invention relates to pultruded fiber reinforced plastic marking devices made with a resin formulation including unsaturated polyester and finely-divided cellulose solid particulates, wherein the resin formulation includes about 2% to 25% by weight of cellulose solid particulates. The fiber reinforcement material of the pultruded marking devices can be unidirectional, bidirectional or multidirectional reinforcing materials, or a combination of two or three of the foregoing types of reinforcing materials. We have found that the addition of cellulose particulates to the polyester resin formulation improves the "fill" of the resin and reinforcement package, by which term we mean the ability of the total resin and reinforcement package to utilize all of the available space in the pultrusion die. A package which does not exhibit good "fill" results in a cured pultruded part that has unacceptable surface imperfections, such as hollow portions similar to dents or gouges, which can range from about $\frac{1}{2}$ inch to as much as 6 inches long in the finished article. The combination of polyester resin and finely-divided cellulose solid particulates in accordance with the invention is particularly useful for the manufacture of pultruded marking devices that include about 30 to 60% by weight of unidirectional reinforcement material as part of the reinforcement package, as a pultruded part made with this amount of unidirectional reinforcement material exhibits unduly poor fill when the cellulose particulates are not included in the resin formulation.

These and other features, objectives, and advantages of the present invention will become apparent from the description which follows, taken in connection with the accompanying drawings that show, for purpose of illustration only, several embodiments of marking devices in accordance with the present invention.

DESCRIPTION OF THE DRAWINGS

FIG. 10 is a perspective view of an additional marking device according to this invention;

FIG. 11 is a cross-sectional view of the marking device of FIG. 10; and

FIG. 12 is a cross-sectional view of an alternate construction for the marking device of FIG. 10.

DESCRIPTION OF THE PRESENTLY-PREFERRED EMBODIMENTS

(a) Method and Apparatus

Figure 1:
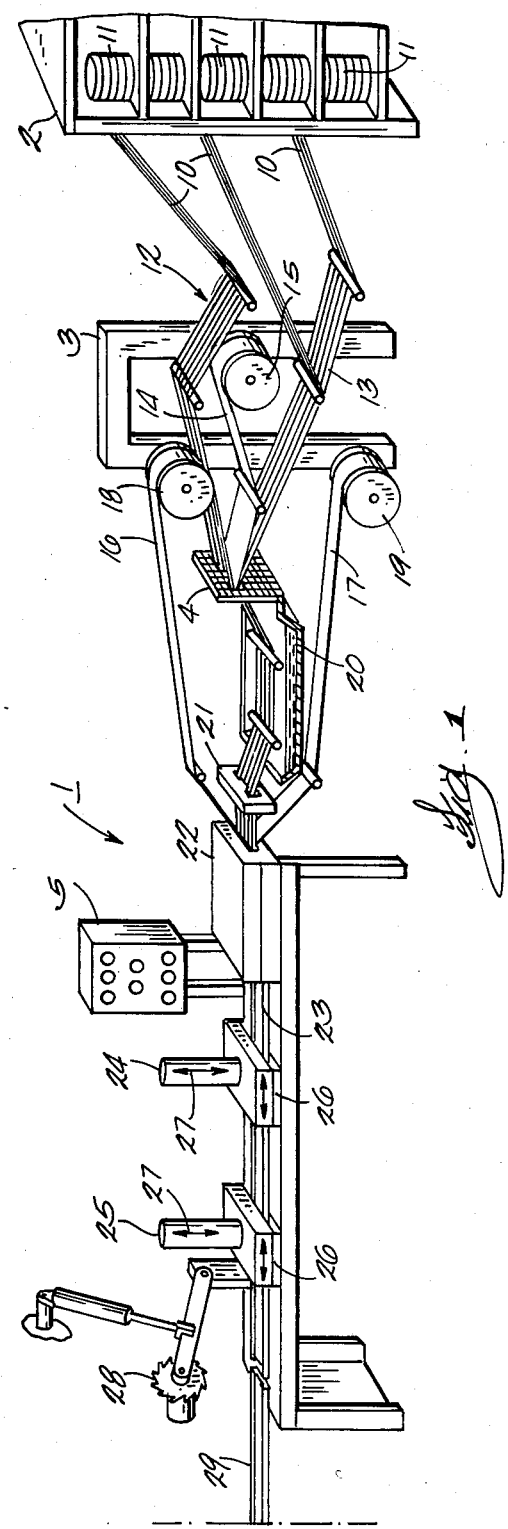
FIG. 1 is a schematic view of a typical pultrusion apparatus and method suitable for manufacture of marking devices of this invention.

FIG. 1 is a schematic view illustrating pultrusion apparatus and method for producing fiber reinforced plastic marking devices of the present invention. The pultrusion apparatus is identified by the general reference numeral 1, and the system includes a roving rack 2 and mat rack 3.

Strands of rovings 10 are withdrawn from spools 11 thereof supported at the roving rack 2, generally comprising a creel consisting of bookcase-type shelves supporting the plurality of spools 11. The rovings 10 are divided into two portions, an upper layer 12 and a lower layer 13.

A web 14 of bidirectional reinforcement material, consisting of scrim (a nonwoven, open mesh reinforcing fabric made with continuous filament yarn) or fabric with longitudinal and transverse strands, is withdrawn from a roll 15 thereof supported on the mat rack 3. The web 14 is arranged between the upper layer 12 and lower layer 13 of rovings 10 so that it will be located along the center of the finished marking device.

An upper web of surface veil 16 and a lower web of surface veil 17 are withdrawn from supply rolls 18 and 19, respectively, thereof also supported at the mat rack 3. Veil 16 is arranged outside of the upper layer 12 of rovings 10 and veil 17 is arranged outside of lower layer 13 of rovings, so that there will be a veil positioned along each surface of the flat marking device that will be formed as described below. The webs of veil 16 and 17 may be lightweight continuous strand polyester or fiberglass surfacing mats.

The two layers of rovings 10 and web 14 are each led through a screen 4 to be arranged in the reinforcement matrix designed for the finished product; the rovings passing through openings in the screen and the web passing through a slot in the screen.

The layers 12, 13 of rovings 10 and web 14 of bidirectional scrim are pulled from their respective supply spools or rolls through a tank or resin bath 20 so as to be impregnated, i.e. wet-out, with resin. (Impregnation of the reinforcement materials can also be accomplished by resin injection with some types of pultrusion apparatus.) The formulation of the resin mixture in the resin bath is a feature of this invention and will be described in complete detail later in this description. The resin mixture can be supplied to the bath 20 in batch or continuous fashion. The rovings 10 will be strung through a pan guide, not shown, in the resin bath so as to retain the physical arrangement selected for the rovings in the finished article and so that each strand will be fully impregnated by the resin mixture. The web 14 of reinforcement material also will be strung through the pan guide, not shown, in the resin bath for the same purpose.

The resin impregnated rovings 10 and web 14 are pulled through a preforming fixture 21 to be consolidated into an arrangement close to the final shape of the finished marking device that is to be produced with the apparatus of FIG. 1.

The rovings 10 and web 14 now impregnated with uncured resin are next pulled into and through a heated forming die 22, and webs 16 and 17 of surface veil are joined to the composite package at die 22 as shown in FIG. 1. The die 22 has an internal cavity that is of the shape and size (with due allowance for polymer shrinkage) appropriate to produce the finished marking device. The die is generally made of metal and can be heated, for example, by electric cartridges, strip heaters, hot oil, or high frequency electronic heating devices. There also may be preheating of the resin impregnated reinforcement materials before entering the die, and/or heating after the product emerges from the die such as with an oven. The die 22 is of sufficient length (such as on the order of, for example, 24 to 36 inches long) and heated to an appropriate temperature, generally in the range of about 250° F. to 350° F., so that the polyester resin mixture used to impregnate the reinforcing materials in the resin bath 20 becomes polymerized or cured as the composite product is pulled through the die, with the line speed of the material through the die being adjusted to provide an appropriate dwell time to effect curing.

Thus, a continuous length of cured product 23 emerges from the die 22. The length of cured product 23 is grasped by traveling clamps 24 and 25 that alternately advance, grasp and pull the cured product through the apparatus. The clamps 24 and 25 are suitably driven, typically hydraulically, to have longitudinal advancement and pulling motions as indicated by the double headed arrows 26 to pull product 23 when moving to the left as viewed in FIG. 1 and advance towards their next pulling operation when moving towards the right, and vertical reciprocal motion as indicated by the double headed arrows 27 to release the product 23 when they move upwards and clamp onto the product when they move downwards. At least one clamp 24 or 25 is pulling the product 23 at all times. Although clamps are depicted in the schematic view of FIG. 1, caterpiller belts are also used in pultrusion apparatus to achieve the same effect.

Located downstream of clamp 25 is a cutoff saw 28 that is actuated intermittently to cut the continuous length of cured product 23 into individual marking devices 29 of the length selected for the end product. Cut off saws used in pultrusion systems are conventional abrasive disks or diamond tipped saw blades and typically include a carriage that is clamped to the cured product 23 during the sawing operation.

It is the continuous pulling exerted on the cured product downstream of the forming die 22 by appropriate puller means as described above that acts to continuously withdraw the reinforcement materials from their respective supply rolls or spools that is characteristic of pultrusion apparatus and methods. Due to the nature of this pulling action, the reinforcing materials used in a pultruded part must be in continuous form, such as webs and strands. When the pultrusion apparatus is first set up for a run, the reinforcing strands or webs are strung through the several stations of the apparatus, i.e. through the resin bath (empty), preforming fixture and die, and under the pulling means or clamps. The resin mixture is then fed into the resin bath, the clamps actuated to start the pulling action, and the die heated to the selected temperature for resin curing. Pultrusion systems include suitable control instruments for measuring, setting and adjusting the various machine conditions and elements as indicated by control panel 5, so that continuous automatic control is a feature of most pultrusion apparatus.

The foregoing is a brief description of a pultrusion process and apparatus appropriate for the manufacture of the marking devices of the invention. More specific information concerning equipment and operating conditions is available from numerous technical publications, such as the book titled *Handbook of Pultrusion Technology*, R. W. Meyer, (Chapman & Hall 1985) and data available from equipment manufacturers and resin suppliers. An advantage of the present marking devices is that they can be made with commercially available pultrusion machines and operated as generally known to those skilled in the art. Another main object of this invention was to develop a new marking device that can be pultruded without requiring special apparatus or operating conditions. Pultrusion machines are available from a number of manufacturers in the U.S. and other countries including Goldsworthy Engineering Inc., Mec-Pro Corporation, Pultrusion Technology, Inc., Morrison Molded Fiberglass Company, and Nordic Supply AS.

(b) Exemplary Configurations

The marking devices of the present invention can be pultruded in various cross-sectional configurations, depending upon their intended end use. The selected configuration most usefully should have at least one planar surface, which can be flat or curved, to which a sign panel can be attached when on an exterior surface of the marking device or through which a sign panel is visible when placed internally of the device. A number of exemplary cross-sections are illustrated in FIGS. 2-9.

Figure 2:
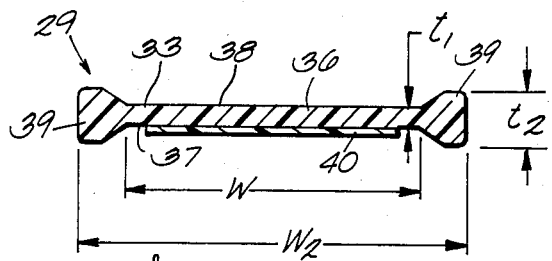
FIG. 2 is a cross-sectional view of a first marking device according to this invention.

FIG. 2 is a cross-sectional view of marking device 29, which includes a central web 36 of thickness $t_1$ and width W having opposed flat exterior planar surfaces 37 and 38 and longitudinal reinforcing ribs 39 positioned one on each side of web 36 that have thickness $t_2$ which is greater than $t_1$. The overall width of marking device 29 is identified as $W_2$. A sign panel 40 is shown as attached to the exterior of surface 37 of device 29; the sign panel 40 can also be attached to surface 38, or there can be a sign panel 40 on both surfaces 37 and 38.

Figure 3:
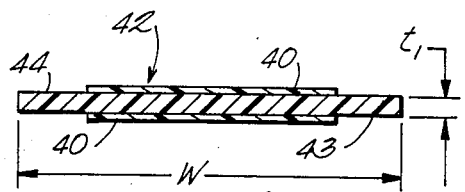
FIG. 3 is a cross-sectional view of a second marking device according to this invention.

FIG. 3 illustrates a marking device 42 in the form of a flat sheet-like member having opposed flat exterior planar surfaces 43 and 44. Marking device 42 hhas dimensions of width W and thickness $t_1$ that is uniform from side to side of the section. A sign panel 40 is shown as attached to both surfaces 43 and 44, but a sign panel can be attached to only one of surfaces 43 and 44 if so desired.

Figure 4:
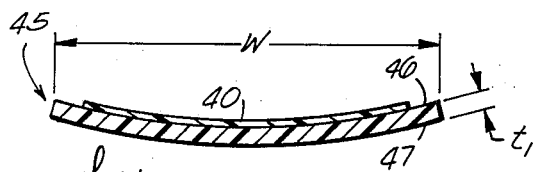
FIG. 4 is a cross-sectional view of a third marking device according to this invention.

Marking device 45 shown in FIG. 4 has a curved section of linear width W and uniform thickness $t_1$ with exterior curved surfaces comprising concave surface 46 and convex surface 47. A sign panel 40 is shown as attached to surface 46 of marking device 45, it being understood the sign panel can be attached to either or both of surfaces 46 and 47.

Figure 5:
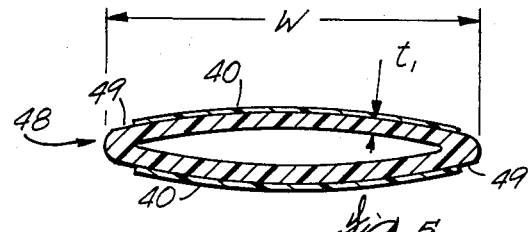
FIG. 5 is a cross-sectional view of a fourth marking device according to this invention.

FIG. 5 shows a hollow generally elliptical-shaped marking device 48 that has two exterior surfaces 49. A sign panel 40 can be attached to both surfaces 49 as illustrated, or to only one of the surfaces.

Figure 6:
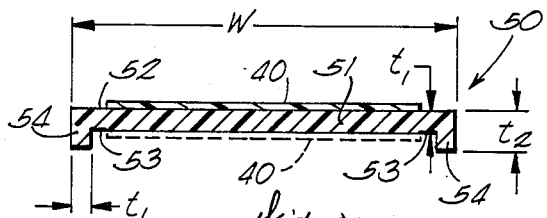
FIG. 6 is a cross-sectional view of a fifth marking device according to this invention.

FIG. 6 illustrates a marking device 50 that is channel shaped and includes a central web 51 with flat exterior planar surfaces 52 and 53 of width W. Wing panels 54 extend from surface 53, there being one wing panel on each side of the central web 51. Web 51 and wing panels 54 are shown as each having a uniform thickness $t_1$, although the wing panels can have a different thickness than that of the web 51. Sign panel 40 can be attached to surface 52 as shown in full line in FIG. 6, or it can be attached to surface 53 as shown in dashed line in FIG. 6, and there can be a sign panel 40 on both surfaces 52 and 53.

Figure 7:
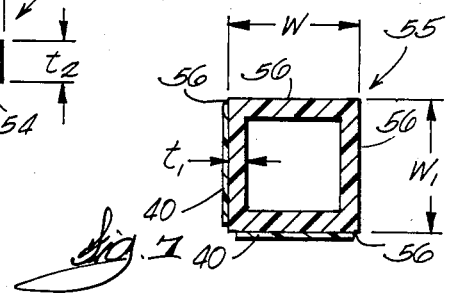
FIG. 7 is a cross-sectional view of a sixth marking device according to this invention.

A four sided hollow square or rectangular marking device marking device 55 is illustrated in FIG. 7 having two sides of width W and the other two sides of width $W_1$. W and $W_1$ can be equal to one another, in which event device 55 will have a square cross section, or W or $W_1$ can be different from one another in which event device 55 will have a rectangular cross section. Four external planar surfaces 56 are provided with a marking device of the construction of post 55, and a sign panel 40 can be attached to one or more of surfaces 56 as desired, which is typified by the illustration of sign panels 40 on two of the intersecting surfaces 56.

Figure 8:
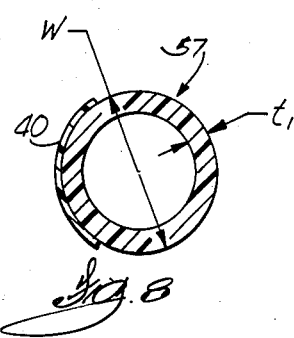
FIG. 8 is a cross-sectional view of a seventh marking device according to this invention.

Marking device 57 illustrated in FIG. 8 is a hollow member with a circular cross section of thickness $t_1$. A sign panel 40 can be attached to the device in various positions, one of which is shown in FIG. 8, or an appropriate flexible sign panel can be attached to the entire circumference of the device. The diameter of marking device 57 is depicted as W in the drawing.

Figure 9:
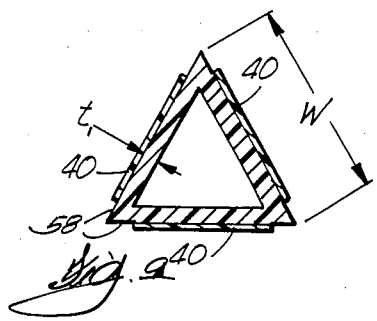
FIG. 9 is a cross-sectional view of another marking device of the invention.

FIG. 9 shows a hollow triangular marking device 58 having an equilateral cross-section with three sides of width W and thickness $t_1$, which can include a sign panel 40 on all three sides as illustrated or on only one or two sides if so desired.

The dimensions of the marking devices can vary over a broad range, and it will be apparent that the specific dimensions selected for a particular product will depend upon the size of the sign panel that is to be supported by the marking device. For the exemplary marking devices 29, 42, 45, 48, 50, 55, 57 and 58 illustrated in FIGS. 2-9, the thickness $t_1$ can be in the range of, for example, about 0.15 inches to 0.75 inches; the thickness $t_2$ of marking devices 29 and 50 can vary depending upon the degree of stiffening required by the ribs 39 or wing panels 54, and $t_2$ in the range of about 0.40 inches to 1.5 inches will be suitable for most applications. The width (or diameter) W, $W_1$ and $W_2$ of the surfaces to which a sign panel is attached or through which a sign panel is to be visible will, as is readily apparent, depend on the size of the sign panel that is to be carried by the marking devices. In general, W, $W_1$ and/or $W_2$ can be in the range of about 2 inches to 15 inches, although larger or smaller values may also be used.

The length of the marking devices will also, again, depend upon the intended use. The marking devices of the present invention can be partially buried in the ground when used outdoors, or can be supported on a base member that rests on the ground or on a surface such as a floor or paved area. A marking device to be partially buried in the ground will be longer than a marking device carried on a base member. The length of the marking device in either use must be selected with a view towards the height at which the sign panel carried by it is to be presented to an observer. Marking devices in the range of about 20 inches to 100 inches long will be suitable for most applications, with marking devices to be partially buried in the ground typically being in the range of about 50 to 100 inches long and those supported on a base member typically in the range of about 20 to 50 inches long. Also, the present marking devices can be in the form of panels to be attached to a wall, post or other suitable support, such as a street sign or warning sign, in which case they can be in the range of about 6 to 36 inches long.

The attachment of a sign panel to an exterior planar surface of the marking device can be accomplished in any manner suitable to the specific sign panel being employed. A sign panel that is a rigid element such as a plastic, fiberglass reinforced plastic or metal sign panel can be attached with mechanical fasteners such as screws, rivets or bolts. Further, however, the sign panel may also comprise a flexible plastic film such as vinyl or the like with a layer of adhesive on its bottom surface that is used to attach the sign panel to the marking device; the adhesive may be a pressure sensitive adhesive, thermoset adhesive, solvent activated adhesive, or whichever adhesive is suitable for the material of the sign panel that will provide secure adhesion of the panel to the marking device.

Instead of being attached to an exterior surface of a marking device, the sign panels 40 also can be encapsulated within the marking devices described above, which construction is described hereinafter by reference to FIG. 12.

The sign panels to be carried on or within a marking device can carry any selected identification matter. The identification matter may comprise a legend consisting of words or phrases to convey the necessary information; an example of this is a printed legend to provide warning of a buried gas line, telephone line, or other utility line in the instance in which a marking device is partially buried in the ground. The identification matter may also include numbers, such as to identify a specific location or particular element. Another style of identification matter that may be carried by the sign panel is a series of alternating colored stripes of retro-reflective matter that provide a warning to the observer; thus alternating diagonal stripes of two different colors may be employed for identification matter of this type, and color coding as adopted by an applicable industry group or required by governmental regulations can be utilized for the stripes. The identification matter also may comprise symbols such as corporate trademarks or ideograms that have accepted meanings. As can be seen, the term identification matter as employed herein and in the claims covers a broad range of informational graphics designed to convey the requisite information to an observer. Also, the marking devices can simply be color-coded to function as providing information to an observer without carrying identification matter on a sign panel.

EXAMPLE 1

A specific marking device 29 of the present invention is illustrated in FIGS. 10 and 11 that was made with apparatus and method as illustrated in FIG. 1. Referring now to FIG. 2, the nominal dimensions of the marking device 29 of this Example are $t_1$ equals 0.155 inches, $t_2$ is 0.370 inches, and W is 3.1 inches. The overall width, $W_2$, of the marking device 29 is 3.8 inches. The length of marking device 29 from top to bottom is 66 inches, and it was designed to have its lower end partially buried in the ground for approximately 12 to 24 inches, preferably about 18 inches, or as otherwise necessary, the ground level being indicated by dashed line 60 in FIG. 10. Sign panel 40 is attached to exterior flat planar surface 37 of device 29 by means of rivets 61 (see also FIG. 11) located at the top and bottom of sign panel 40. Sign panel 40 carries printed identification matter 62 consisting of the legend "Caution Buried Gas Line".

The internal construction of marking device 29 of Example 1 is illustrated in FIG. 11. Web 14 of scrim is positioned along the transverse centerline of the device. Strands of rovings 10 of upper layer 12 are arranged between web 14 of scrim and surface 37 of the marking device. Strands of rovings 10 of lower layer 13 are positioned between web 14 of scrim and exterior surface 38 of the marking device. The upper web of surface veil 16 extends about exterior surface 37 and is located at or just under the surface and partially around ribs 39. The lower web of surface veil 17 is similarly disposed about surface 38 of marking device 29, and the webs of surface veil 16 and 17 are overlapped along the ends of ribs 39 as illustrated. Rovings 10 and webs 14, 16 and 17 are encapsulated in a matrix of cured resin 65. The rovings 10 are PPG type 1064 rovings with a yield of 123 yards per pound; there are 47 rovings in upper layer 12 and 47 rovings in lower layer 13. The web 14 of scrim is fiberglass scrim with longitudinal and transverse threads with a weight of 1.6 ounces per square yard. The webs of surface veil 16 and 17 were each nonwoven surfacing mats of polyester fiber with a weight of 0.75 ounce per square yard. While rovings 10 are illustrated of uniform circular section in FIG. 10 for clarity of illustration, it will be understood by those skilled in the art that the rovings will assume other shapes in the cured device.

The sign panels 40 as illustrated in FIGS. 2-11 are attached to one or more exterior surfaces of the marking devices. However, a preferred construction is to have one or more sign panels 40 positioned within a marking device so that they will be covered and protected by a thin layer of cured resin and surface veil, which can be particularly important when the marking device is intended for use outdoors. This can be done by prior art techniques such as printing identification matter on a web of mat or surface veil prior to pulling it through the forming die or by laminating a printed surface web to the pultruded marking device with resin after it leaves the forming die and has been cured. An especially preferred construction is illustrated in the copending, commonly owned U.S. patent application entitled Pultruded Composite Sign and Process Therefor, Ser. No. 148,824, filed on the same date herewith, the disclosure of which is incorporated herein by reference. This construction is illustrated in FIG. 12, taken along the same plane as FIG. 11, as an alternative construction for marking device 29 as it is illustrated in FIGS. 10 and 11.

A sign panel 40a comprising a paper which allows good print definition and which is saturable with the resin formulation is printed with the selected identification matter and attached to the innermost surface of veil 16. The sign panel 40a can be attached to the veil by heat sealing, sonic sealing or adhesive. The use of the thin, lightweight veil at the surface of the marking device provides a resin rich surface which is transparent or translucent so that identification matter printed on the sign panel 40a will be visible to an observer through the resin rich surface and the veil. This construction enables the sign panel 40a to be encapsulated by the resin, which provides for increased protection of the sign panel; this is especially useful when the marking device carrying the sign panel is used outdoors and will be exposed to the elements. Complete details of producing a marking device with a sign panel within the post may be had by reference to the aforesaid copending patent application. Marking devices 42, 45, 48, 50, 55, 57, and 58 of FIGS. 3-9 respectively can also incorporate one or more sign panels positioned along the interior of the devices as illustrated in FIG. 12 in connection with marking device 29.

(c) EXAMPLES 2-4

As noted in the Summary of the Invention, the present invention provides a new resin formulation for use in the manufacture of pultruded marking devices that combines finely-divided cellulose solid particulates with unsaturated polyester resin. The addition of the cellulose particulates to the resin formulation in this manner has been found to result in improved "fill" of the resin and reinforcement package within the pultrusion die. That is, the addition of the cellulose particulates results in a resin formulation that completely fills the cavity in a pultrusion die so as to result in a cured pultruded product that has exterior surfaces, flat or curved as the case may be, having an excellent surface finish free of indentations, gouges and the like. In addition, it has been found that combining cellulose particulates in the resin system prevents "lock up" of the pultrusion apparatus as a result of resin hardening in the die when inadequate fill is obtained. These advantages become particularly apparent when the pultruded marking device has only about 30% to 60% by weight of unidirectional reinforcement material such as rovings, calculated as a percentage of the total weight of the device, e.g. a high resin to glass ratio. The following Examples 2-4 demonstrate the efficacy of the addition of cellulose particulates in accordance with the concepts of the invention.

EXAMPLE 2

Marking devices 29 according to Example 1 were pultruded using the following formulation for the resin matrix 65, which resin formulation was added to the resin bath 20 of the pultrusion apparatus.

|  | Percent by Weight |
|---|---|
| Polyester Resin(1) | 71.32% |
| Styrene Monomer | 15.69 |
| Cellulose Solid Particulates average particle size of 30 microns(2) | 10.27 |
| Catalyst | 0.99 |
| (1) t-butyl perbenzoate, a high temperature catalyst | 0.71% |
| (2) bis(4-t-butylcyclohexyl) peroxydicarbonate, a low temperature catalyst | 0.28% |
| Inhibitor 1,4-benzoquinone(3) | 0.08 |
| UV Stabilizer 2-(2'-hydroxy-5'methylphenyl) benzotriazole | 0.48 |
| Pigment orange pigment | 0.77 |
| Mold Release Agent organo-phosphate compound(4) | 0.40 |
|  | 100% |

(1)Stypol* 40-2304 sold by Freeman Chemical.
(2)Celufil* 13292 sold by United States Biochemical Corporation.
(3)As 2% solution in styrene.
(4)Synpro* 1301 sold by Synthetic Products.
(The * used as a superscript in the above footnotes and in footnotes of Examples 3 and 4 denotes a trademark of the specified company.)

The cured marking devices including the above formulation of this Example 2 as the resin matrix 65 and the rovings, scrim and surface veil of Example 1 had the following composition.

|  | Percent by Weight |
|---|---|
| Resin matrix | 48.50% |
| Rovings | 50.06 |
| Scrim | 0.69 |
| Surface veil | 0.75 |
|  | 100% |

It was noted during pultrusion of the marking devices of Example 2 that excellent fill of the die cavity was obtained that resulted in cured marking devices having excellent flat surface finish without unacceptable indentations (which are an indicator of inadequate fill). Also, the pultrusion apparatus was run continuously at production speeds without "lock-up". In addition, it was noted that the cured devices were free of internal voids. These advantages were due to the inclusion of cellulose particulates in the resin formulation, as further demonstrated by the results of Comparative Example 3 below. Moreover, the resin formulation of this Example provided excellent impregnation of and bonding to the reinforcement materials.

COMPARATIVE EXAMPLE 3

Marking devices 29 of Example 1 were pultruded using the

|  | Percent by Weight |
|---|---|
| Polyester Resin(1) | 88.39% |
| Styrene Monomer | 8.84 |
| Catalyst | 0.95 |
| (1) t-butyl perbenzoate, a high temperature catalyst | 0.67% |
| (2) bis(4-t-butylcyclohexyl) peroxydicarbonate, a low temperature catalyst | 0.28% |
| Inhibitor 1,4-benzoquinone(2) | 0.09 |
| UV Stabilizer 2-(2'-hydroxy-5'methylphenyl) benzotriazole | 0.60 |
| Pigment orange pigment | 0.74 |
| Mold Release Agent organo-phosphate compound(3) | 0.39 |

-continued

|  | Percent by Weight |
|---|---|
|  | 100% |

[1] Stypol® 40-2304 sold by Freeman Chemical.
[2] As 2% solution in styrene.
[3] Synpro® 1301 sold by Synthetic Products.

The cured marking devices including the resin formulation of this Comparative Example 3 as the resin matrix 65 and the rovings, scrim and surface veil of Example 1 had the following composition.

|  | Percent by Weight |
|---|---|
| Resin matrix | 48.50% |
| Rovings | 50.06 |
| Scrim | 0.69 |
| Surface veil | 0.75 |
|  | 100% |

During pultrusion of the marking devices of this Comparative Example 3 it was found that the cured devices had an unacceptable surface finish comprising numerous indentations of various sizes of from about ½ inch to 6 inches long and about ⅛ inch to ⅜ inch wide that were generally about 1/32 inch to ⅛ inch deep. The indentations were oriented in the machine direction of the devices. This is an unacceptable surface finish for marking devices that resulted from inadequate fill of the die cavity by the resin formulation of this Example. The cured devices also were found to have internal voids. Furthermore, it was found that the pultrusion apparatus would "lock-up" after running for about 5 to 10 minutes due to hardening of the resin inside the die, which also was a result of the inadequate fill of the die cavity with this resin formulation. We therefore concluded that marker devices could not be pultruded with the resin and reinforcement package of this Comparative Example 3.

The marking devices of Example 2 are relatively rigid members and some uses of the devices require enhanced flexibility and/or impact strength. This can be accomplished by adding a reactive liquid elastomeric polymer to the resin formulation that reacts with the unsaturated polyester upon curing. This is shown by Example 4.

EXAMPLE 4

Marking devices 29 according to Example 1 were pultruded using the following formulation for the resin matrix 65, which resin formulation was added to the resin bath of the pultrusion apparatus.

|  | Percent by Weight |
|---|---|
| Polyester Resin[1] | 64.66% |
| Styrene Monomer | 14.23 |
| Cellulose Solid Particulates average particle size of 30 microns[2] | 9.31 |
| Catalyst | 0.91 |
| (1) t-butyl perbenzoate, a high temperature catalyst | 0.65% |
| (2) bis(4-t-butylcyclohexyl) peroxydicarbonate, a low temperature catalyst | 0.26% |
| Inhibitor 1,4-benzoquinone[3] | 0.08 |
| UV Stabilizer 2-(2'-hydroxy-5'methylphenyl) benzotriazole | 0.44 |

-continued

|  | Percent by Weight |
|---|---|
| Pigment orange pigment | 0.70 |
| Mold Release Agent organo-phosphate compound[4] | 0.36 |
| Reactive Liquid Elastomer Polymer butadiene-acrylonitrile copolymer[5] | 9.31 |
|  | 100% |

[1] Stypol® 40-2304 sold by Freeman Chemical.
[2] Celufil® 13292 sold by United States Biochemical Corporation.
[3] As 2% solution in styrene.
[4] Synpro® 1301 sold by Synthetic Products.
[5] Hycar® 1300X24 sold by The B. F. Goodrich Company.

The cured devices including a resin matrix of the formulation of this Example 4 and the rovings, scrim and surface veil of Example 1 had the following composition.

|  | Percent by Weight |
|---|---|
| Resin formulation | 48.33% |
| Rovings | 50.23 |
| Scrim | 0.69 |
| Surface veil | 0.75 |
|  | 100% |

During pultrusion of marking devices 29 with a resin matrix 65 of the formulation of Example 4, excellent fill of the die cavity was obtained, the cured devices had excellent surface finish with smooth flat surfaces free of unacceptable indentations, the pultrusion apparatus ran continuously at production speeds without "lock-up", and the cured devices were free of internal voids. These useful features were the same as observed with marking devices of Example 2 and are the result of incorporating the cellulose solid particulates in the formulation for the resin matrix. In addition, however, the marking devices 29 of Example 4 when tested in a test fixture with one end fixed were bent around a radius of curvature of approximately 6¾ inches and returned to a straight condition without damage after being bent in this fashion. The devices 29 of Example 2 under the same test conditions were bent around a radius of about 8 inches and returned to a straight condition without damage. The enhanced ability to be bent around a smaller radius of a curvature and return to a straight condition without physical damage results in the formulation of Example 4 being the presently-preferred resin matrix composition for a marking device that may be hit by a car or truck in the field as compared to devices according to Example 2. The added flexibility of the marking devices of Example 4 is due to the incorporation of the butadiene-acrylonitrile copolymer in the resin matrix which reacts with the unsaturated polyester during curing, in combination with the ratio of resin to unidirectional reinforcement material according to the present invention.

(D) DISCUSSION

The problem of obtaining adequate fill with a pultruded marking device, with its resultant effects on poor surface finish and poor machine processability is particularly acute with pultruded devices having unidirectional reinforcement material, such as fiberglass or nylon rovings or carbon fiber tows, as the principal reinforcing material in an amount of about 30% to 60% by weight of the total weight of the device, and is further attenuated when a device also includes less than about 15% by weight of bi-directional and/or multidirectional reinforcement materials. The solutions to the problem as known in the art are to either increase the amount of unidirectional reinforcement material to about 65% of total part weight, even as high as 80% of total part weight, so as to obtain adequate fill, or to use a high proportion of bidirectional and/or multidirectional reinforcement materials in the range of about 30% to 60% of the total weight of the pultruded part. The concept of the present invention of adding cellulose solid particulates to the formulation for the resin matrix of a pultruded marking device obviates the need to resort to the known techniques for obtaining adequate fill and does not require using additional quantities or types of reinforcement materials to solve the problem, but yet results in the manufacture of high quality pultruded marking devices and permits continuous operation of a pultrusion apparatus. Practice of the present invention also can result in cost savings because the new pultruded marking devices require a lesser percentage of reinforcement materials. The cellulose solid particulates are less expensive than most glass reinforcement materials, for example, and the cost savings are even more significant when the more expensive aramid and carbon types of reinforcement materials are used for the pultruded devices. All of these benefits are obtained with a pultruded marking device of the invention while still maintaining physical properties.

The present invention provides pultruded fiber reinforced plastic marking devices having reinforcement material embedded in a resin matrix wherein the marking device includes about 30% to 60%, preferably about 45% to 55%, by weight of unidirectional reinforcement material and about 0.5% to 15%, preferably about 1% to 7%, by weight of bidirectional and/or multidirectional reinforcement materials in a resin matrix including cured polyester resin and cellulose solid particulates. For most marking devices of the invention, fiberglass rovings are the most useful form of unidirectional reinforcement material, particularly when product cost is an important factor; rovings of nylon fibers, tows of carbon fibers and unidirectional forms of polyester fiber or aramid fiber reinforcement materials also can be used, and one or more of such materials can be combined with fiberglass rovings in a marking device. The formulation for the resin matrix is to include unsaturated polyester resin and about 2% to 25% by weight of cellulose solid particulates; the unsaturated polyester resin generally will comprise about 60% to 90% by weight of the formulation for the resin matrix. We have found that about 6% to 15% by weight of the cellulose solid particulates in the foregoing composition is especially useful for most marking devices of the invention. Our development work concerning this invention has shown that the cellulose solid particulates should be finely-divided and have an average particle size in the range of about 20 microns to 100 microns. The cellulose solid particulates increase the viscosity of the formulation for the resin matrix prior to curing, with the smaller size particles increasing viscosity to a greater extent than the larger size particles within the foregoing size range. The amount of cellulose solid particulates added to the formulation should be such as will result in a formulation for the resin matrix having a viscosity in the range of about 1,000 centipoises to 5,000 centipoises at an ambient temperature of 70° F. prior to being cured so as to result in a resin formulation that can be processed with pultrusion apparatus. The specific proportion of cellulose particulates added to the formulation within the foregoing percentage range will vary depending upon the average particle size chosen for the particulates. Thus, if cellulose solid particulates with an average particle size in the range of about 20 to 40 microns are selected, the formulation for the resin matrix can have up to about 15% by weight of particles and yield a formulation within the stated viscosity range; on the other hand, if larger size cellulose particulates in the range of about 80 to 100 microns are employed, the formulation for the resin matrix can have about 25% by weight of such particles and yield a resin formulation with a viscosity within the stated range.

The reactive liquid elastomeric polymer such as the butadiene-acrylonitrile copolymer described in Example 4 above is an optional ingredient that can be added to the above formulation of the present invention for certain specific end uses of marking devices of the present invention that may require enhanced flexibility characteristics. Our development work as to this aspect of the invention has demonstrated that the butadiene-acrylonitrile copolymer can be used in the amount of about 2% to 15% by weight of the formulation for the resin matrix, preferably in the range of about 7% to 12% by weight. The lower end of this range represents a threshold level at which the effect on flexibility begins to be observed, and adding a copolymer proportion in excess of about 15% results in excessive phase separation of the copolymer. Thus, a pultruded fiber reinforced plastic marking device of the composition of the present invention as defined in the preceding paragraph when employing this optional ingredient will further include about 2% to 15% weight of a reactive liquid polymer such as butadiene-acrylonitrile copolymer in the formulation for the resin matrix that reacts with the unsaturated polyester upon curing thereof.

Both of the above formulations for the resin matrix also will necessarily include a small percentage of an appropriate catalyst or catalysts for the unsaturated polyester resin, as required to obtain curing of the resin. Other ingredients that may be included in the formulation are pigment, mold release agent, UV inhibitor if the marking device is intended for outdoor use, and inorganic filler such as clay, talc or calcium carbonate. Useful percentages for most of these ingredients are illustrated in the foregoing examples or are a matter of general knowledge in the pultrusion art.

While it is clear that the addition of finely-divided cellulose solid particulates to the resin matrix in accordance with the invention adds bulk to the resin and reinforcement package so as to obtain enhanced fill of the die cavity, we do not know the mechanism by which this advantageous result is achieved. The cellulose particulates seem to pull resin into the marking devices and provide greatly improved impregnation of the reinforcement materials than can be obtained if not used as taught by this invention. One explanation that has been theorized is that the cellulose solids absorb polyester resin and swell in size due to their organic composition. Perhaps also the cellulose solid particulates provide the requisite bulk without absorbing polyester or swelling. In any event, our experimental work as reported hereinabove demonstrates the efficacy of the addition of the cellulose solid particulates to achieve the desired results, and we do not wish to be bound by any theory as to the mechanism by which it achieves this functionality.

The foregoing enabling description of this invention, including the manner and process for making and using it, sets forth several exemplary constructions of marking devices incorporating the concepts of the invention, but it will be apparent to those of ordinary skill in the art that the exemplary embodiments can be modified in various ways and yet result in a pultruded fiber reinforced plastic marking device that is within the scope of this invention and it is therefore intended that the appended claims encompass all obvious modifications of the disclosed embodiments within the true spirit and scope of our invention.

We claim:

1. A pultruded fiber reinforced marking device of fiber reinforcement material embedded in a cured plastic resin matrix of a formulation including unsaturated polyester resin, characterized in that
    (a) unidirectional reinforcement material comprises about 30% to 60% of the total weight of the marking device,
    (b) bidirectional reinforcement material, multidirectional reinforcement material, or a combination thereof, comprises about 0.5% to 15% of the total weight of the marking device, and
    (c) the resin matrix comprises the balance by weight of the marking device and includes
        (1) polyester resin, and
        (2) finely-divided cellulose solid particulates in an amount providing a formulation for the resin matrix having a viscosity in the range of about 1,000 to 5,000 centipoises at an ambient temperature of 70° F. prior to being cured.

2. A pultruded fiber reinforced marking device of fiber reinforcement material embedded in a cured plastic resin matrix of a formulation including unsaturated polyester resin, characterized in that
    (a) unidirectional reinforcement material comprises about 30% to 60% of the total weight of the marking device,
    (b) bidirectional reinforcement material, multidirectional reinforcement material, or a combination thereof, comprises about 0.5% to 15% of the total weight of the marking device, and
    (c) the resin matrix comprises the balance by weight of the marking device and includes
        (1) polyester resin, and
        (2) about 2% to 25% by weight of cellulose solid particulates having an average particle size of about 20 microns to 100 microns.

3. A marking device according to claim 2 further characterized in that
    the resin matrix includes about 6% to 15% by weight of the cellulose solid particulates.

4. A marking device according to claim 2 further characterized in that
    the unidirectional reinforcement material comprises about 45% to 55% of the total weight of the marking device, and the bidirectional or multidirectional reinforcement material comprises about 1% to 7% of the total weight of the marking device.

5. A marking device according to claim 2 further characterized in that
    the marking device carries a sign panel bearing identification matter.

6. A marking device according to claim 2 further characterized in that
    the marking device is about 6 inches to 100 inches long and about 2 inches to 15 inches wide and has a cross-sectional shape as illustrated in FIG. 2 with thickness $t_1$ about 0.15 inches to 0.75 inches and thickness $t_2$ about 0.40 inches to 1.5 inches.

7. A marking device according to claim 2 further characterized in that
    the marking device is about 6 inches to 100 inches long and about 2 inches to 15 inches wide and has a cross-sectional shape as illustrated in FIG. 3 with thickness $t_1$ about 0.15 inches to 0.75 inches.

8. A marking device according to claim 2 further characterized in that
    the marking device is about 6 inches to 100 inches long and about 2 inches to 15 inches wide and has a cross-sectional shape as illustrated in FIG. 4 with thickness $t_1$ about 0.15 inches to 0.75 inches.

9. A marking device according to claim 2 further characterized in that
    the marking device is about 6 inches to 100 inches long and about 2 inches to 15 inches wide and has a cross-sectional shape as illustrated in FIG. 5 with thickness $t_1$ about 0.15 inches to 0.75 inches.

10. A marking device according to claim 2 further characterized in that
    the marking device is about 6 inches to 100 inches long and about 2 inches to 15 inches wide and has a cross-sectional shape as illustrated in FIG. 6 with thickness $t_1$ about 0.15 inches to 0.75 inches and thickness $t_2$ about 0.40 inches to 1.5 inches.

11. A marking device according to claim 2 further characterized in that
    the marking device is about 6 inches to 100 inches long and has a cross-sectional shape as illustrated in FIG. 7 with thickness $t_1$ about 0.15 inches to 0.75 inches, thickness $t_2$ about 0.40 inches to 1.5 inches and W and $W_1$ each about 2 inches to 15 inches.

12. A marking device according to claim 2 further characterized in that
    the marking device is about 6 inches to 100 inches long and has a cross-sectional shape as illustrated in FIG. 8 with thickness $t_1$ about 0.15 inches to 0.75 inches and W about 2 inches to 15 inches.

13. A marking device according to claim 2 further characterized in that
    the marking device is about 6 inches to 100 inches long and has a cross-sectional shape as illustrated in FIG. 9 with thickness $t_1$ about 0.15 inches to 0.75 inches and W about 2 inches to 15 inches.

14. A marking device according to any one of the claims 2-13 characterized further in that
    the resin matrix also includes about 2% to 15% by weight of reactive liquid butadiene-acrylonitrile copolymer added to the formulation for the resin matrix prior to being cured that reacts with the unsaturated polyester upon curing of the resin matrix.

15. A marking device according to any one of the claims 2-13 characterized further in that
    the resin matrix also includes about 7% to 12% by weight of reactive liquid butadiene-acrylonitrile copolymer added to the formulation for the resin matrix prior to being cured that reacts with the unsaturated polyester upon curing of the resin matrix.

16. A method for pultruding a fiber reinforced plastic marking device including fiber reinforcement material embedded in a cured plastic resin matrix with pultrusion apparatus of the type including a resin bath, a die having an internal cavity in the shape of the device, and pulling means for pulling the cured device through the apparatus, characterized as including the steps of
  (1) supplying a formulation for the resin matrix to the resin bath including unsaturated polyester resin and about 2% to 25% by weight of the formulation of cellulose solid particulates having an average particle size of about 20 microns to 100 microns;
  (2) pulling unidirectional reinforcement material through the resin bath to become impregnated with the resin formulation in a quantity sufficient to provide about 30% to 60% by weight thereof in the cured marking device;
  (3) pulling bidirectional or multidirectional reinforcement material through the resin bath to become impregnated with the resin formulation in a quantity sufficient to provide about 0.5% to 15% thereof in the cured marking device;
  (4) pulling the reinforcement materials through the die and heating the die to cure the resin formulation therein to form the cured resin matrix; and
  (5) pulling a continuous length of the cured marking device from the die and defining individual marking devices therefrom.

17. A method according to claim 16 further including the step of
  adding surface veil at the die and arranged around the exterior of the other reinforcement materials impregnated with the formulation for the resin matrix.

18. A method according to claim 16 or 17 further including the step of
  adding a reactive liquid butadiene-acrylonitrile copolymer to the resin formulation supplied to the resin bath that reacts with the unsaturated polyester resin thereof upon curing of the resin matrix.

* * * * *

UNITED STATES PATENT AND TRADEMARK OFFICE
CERTIFICATE OF CORRECTION

PATENT NO. : 4,812,343
DATED : March 14, 1989
INVENTOR(S) : John H. Kiekhaefer, et al.

It is certified that error appears in the above-identified patent and that said Letters Patent is hereby corrected as shown below:

Column 2, line 14, delete "7/8" and substitute --3/4--.

Column 5, line 67, delete "hhas" and substitute --has--.

Column 6, line 29, delete "marking device".

Column 10, line 45, delete "'" and substitute --2--.

Column 10, line 51, after "the" insert --following resin formulation, which is the same as that of Example 2 except that it does not include cellulose particulates.--

Column 13, line 2, delete "attentuated" and substitute --attenuated--.

Signed and Sealed this

Tenth Day of October, 1989

Attest:

DONALD J. QUIGG

*Attesting Officer*

*Commissioner of Patents and Trademarks*